United States Patent [19]
Walker et al.

[11] Patent Number: 6,018,718
[45] Date of Patent: Jan. 25, 2000

[54] METHOD AND SYSTEM FOR PROCESSING CUSTOMIZED REWARD OFFERS

[75] Inventors: Jay S. Walker, Ridgefield; Sanjay K. Jindal, Wilton; Toby Weir-Jones, Stamford, all of Conn.

[73] Assignee: Walker Asset Management Limited Partnership, Stamford, Conn.

[21] Appl. No.: 08/921,868

[22] Filed: Aug. 28, 1997

[51] Int. Cl.[7] .................................................. G06F 17/60
[52] U.S. Cl. .............................................. 705/14; 705/38
[58] Field of Search .................................. 705/14, 30, 34, 705/35, 38, 39, 40, 41

[56] References Cited

U.S. PATENT DOCUMENTS

| | | | |
|---|---|---|---|
| 4,876,592 | 10/1989 | Von Kohorn | 348/13 |
| 5,025,372 | 6/1991 | Burton et al. | 705/14 |
| 5,053,957 | 10/1991 | Suzuki | 705/14 |
| 5,056,019 | 10/1991 | Schultz et al. | 705/14 |
| 5,287,268 | 2/1994 | McCarthy | 705/14 |
| 5,297,026 | 3/1994 | Hoffman | 705/14 |
| 5,466,919 | 11/1995 | Hovakimian | 705/17 |
| 5,483,444 | 1/1996 | Heintzeman et al. | 705/5 |
| 5,537,314 | 7/1996 | Kanter | 705/14 |
| 5,621,640 | 4/1997 | Burke . | |
| 5,710,886 | 1/1998 | Christensen et al. | 705/14 |

OTHER PUBLICATIONS

Peter Sinton, "Pick A Card, But Not Just Any Card", The San Francisco Chronicle, Oct. 10, 1994, Monday, Final Edition at p. D1.

Cliff Jones, "Plastic Interest In Sweet Charity", The Guardian Newspaper, Dec. 10, 1994, at p. 35.

"Drexel Alumni Affinity Card", Drexel University (http://alum.ia.drexel.edu) Jan. 1, 1996.

Jay Greene, "They're Selling Your Secrets", The Orange County Register, Apr. 21, 1996 at p. AO1.

Edmund Sanders, "Card Sharks", The Orange County Register, Jun. 15, 1997 at p. K01.

Alan Jolis, "The Good Banker", The Independent, May 5, 1996.

"Affinity Cards", BradescoNet Internet Banking (http://www.bradesco.com.br/veringl/ccard/affinity/closedc.html) download date Jul. 21, 1996.

"MasterCard Affinity Card", McGill University (http://www.mcgill.ca.alumni/m_card.htm), download date Jul. 21, 1996.

"The Binghamton University Alumni Association MasterCard Credit Card" Binghampton University (http://www-.webapply.com/bingu/apply.htm), download date: Jul. 21, 1996.

"AAA Michigan Savings", AAA Group Insurance (http://www.aamich.com/savings/group/index/html) download date Mar. 25, 1997.

Chris O'Malley, "RCA Seeks to Collar the Affinity Credit--Card Market", The Indianapolis Star, Mar. 28, 1997 at p.F01.

"Choosing a Credit Card", The Times, Jul. 5, 1997.

(List continued on next page.)

*Primary Examiner*—Stephen R. Tkacs
*Attorney, Agent, or Firm*—Dean Alderucci

[57] ABSTRACT

The present invention is a method is for providing and managing a customized reward offer to a holder of a financial account. The method includes the step of accessing historical account data associated with the financial account. The method further includes the step of determining a first performance target associated with the financial account. The method also includes the steps of selecting a reward offer having an associated reward description and transmitting the first performance target and the reward description to the account holder. The method continues with the steps of collecting transaction data associated with the financial account and evaluating the collected transaction data to determine a second performance target associated with the financial account. The collected transaction data is then compared to said first performance target. If the collected transaction data exceeds the first performance target, the financial account is updated to reflect the reward. A system is also provided to implement the steps of the method.

46 Claims, 8 Drawing Sheets

OTHER PUBLICATIONS

Mary Ann McNulty, "GE Capital Idea: Push Policy", Business Travel News, Jul. 14, 1997.

"New Partners, More Exciting Rewards: The Membership Rewards Program for 1998", American Express, (http://www.americanexpress.com/rewards/news/docs/1998new_mr.shtml), download date: Mar. 12, 1998.

"BCAA Auto Related Products", BCAA, (http://bcaa.bc.ca/auto/body/body_auto_prod.html), download date: Mar. 12, 1998.

"The Centura Cashmax Card", CashMax Visa or Mastercard, (http://www.centura.com/cashcards/cashmax.html), download date Mar. 12, 1998.

"Chase Gold Visa Customer Rewards", The Chase Manhattan Corporation, (http://www.chase.com/goldvisa/rewards.html), download date: Mar. 12, 1998.

"Citibank Cards and Services", Citicorp, (http://www.citibank.com/us/cards/crd.svc/citicard), download date: Mar. 12, 1998.

"Citibank Driver's Edge—Earning and Redeeming Rebates", Citicorp, (http://www.citibank.com/us/cards/driver-edge/earning.html), download date: Mar. 12, 1998.

"Discover Card Features", Discover Card, (http://www.discovercard.com/discover/data/features.htm), download date: Mar. 12, 1998.

"KMART Rewards Earn Up To 6%", Kmart Corporation, (http://www.kmart.com/a%5Fprod/a1%5Fcre/a1a%5Frew/a1a%Fct.stm), download date: Mar. 12, 1998.

"GE Capital Consumer Financial Services", GE Capital Financial Services, (http://ge.com/capital/consumer/rewards.htm), download date: Mar. 12, 1998.

"Mobil Speedpass", Mobil Business, (http://www.mobil.com/business/credit/fleet/product.html), download date: Mar. 12, 1998.

"Credit Cards, State Capital Credit Union", State Capital Credit Union, (http://www.capitalcu.org/credcard.html), download date: Mar. 12, 1998.

"Soundoff", The American Banker, Jul. 11, 1994 at p. 12.

Peter Child, Robert J. Dennis, Timothy C. Gokey, Tim. I. McQuire et al., "Can Marketing Regain The Personal Touch?", McKinsey Quarterly, 1995, Section: No. 3, p. 112–125.

"Databases Key Customer Retention Says New Report", Food Institute Report, May 13, 1996, Section: No. 18, vol. 69.

"The Winner At A Glance", Card News, Sep. 30, 1996, Section: vol. 11, No. 19.

| ACCOUNT ID 310 | CARD HOLDER NAME 312 | ADDRESS 314 | TELEPHONE NUMBER 316 | TOTAL CREDIT LINE 318 | AVAILABLE CREDIT LINE 320 | AVERAGE QUARTERLY CHARGE VOLUME 322 | AVERAGE QUARTERLY OUTSTANDING BALANCE 324 | AVERAGE TRANSACTIONS PER MONTH 326 |
|---|---|---|---|---|---|---|---|---|
| 2222-3333-4444-5555 | TIM SMITH | 99 MAIN ST. HOMETOWN, CT 22222 | (333) 444-5555 | $2,000 | $1,233 | $1,000 | $500 | 8 |
| 9999-9999-9999-9999 | SUE C. CARDHOLDER | 10 CENTER ST. ROCKPORT, NJ 99999 | (999) 111-2222 | $3,500 | $0 | $3,000 | $2,000 | 20 |
| 7777-3333-2222-1111 | JOHN JOHNSON | 123 ELM ST. SMALL TOWN, USA 00551 | (222) 111-2222 | $10,000 | $10,000 | $4,000 | $0 | 35 |

FIG. 3

| ACCOUNT ID 410 | TARGET PERIOD 412 | TARGET TYPE 414 | TARGET PARAMETER 416 | REWARD TYPE 418 | REWARD TERMS 420 | STATUS 422 |
|---|---|---|---|---|---|---|
| 2222-3333-4444-5555 | 1ST QUARTER 1997 | QUARTERLY CHARGE VOLUME | $1,500 | CASH REBATE | 2% FOR CHARGES OVER TARGET | YES |
| 9999-9999-9999-9999 | 1ST QUARTER 1997 | QUARTERLY OUTSTANDING BALANCE | $2,500 | FREQUENT FLYER MILES | 1 MILE PER DOLLAR FOR BALANCE ABOVE TARGET | NO |
| 7777-3333-2222-1111 | 1ST QUARTER 1997 | MONTHLY TRANSACTIONS | 45 | APR REDUCTION | 12.9% APR FOR 6 MONTHS | YES |
| 2222-3333-4444-5555 | 2ND QUARTER 1997 | QUARTERLY CHARGE VOLUME | $1,750 | CASH REBATE | 2% FOR CHARGES OVER TARGET | NO |
| 9999-9999-9999-9999 | 2ND QUARTER 1997 | QUARTERLY OUTSTANDING BALANCE | $2,000 | FREQUENT FLYER MILES | 1 MILE PER DOLLAR FOR BALANCE OVER TARGET | NO |
| 7777-3333-2222-1111 | 2ND QUARTER 1997 | MONTHLY TRANSACTIONS | 50 | APR REDUCTION | 11.9% APR FOR 6 MONTHS | NO |

FIG. 4

| TRANSACTION ID 508 | ACCOUNT ID 510 | MERCHANT ID NUMBER 512 | TRANSACTION AMOUNT 514 | DATE 516 | TIME 518 | CREDIT CARD AUTHORIZATION NUMBER 522 |
|---|---|---|---|---|---|---|
| 11223333 | 2222-3333-4444-5555 | 22334 | $19.75 | 2/15/97 | 3:05 PM | 4062 |
| 11324444 | 2222-3333-4444-5555 | 32454 | $38.25 | 3/10/97 | 1:30 AM | 4321 |
| 11547889 | 2222-3333-4444-5555 | 13987 | $45.84 | 3/11/97 | 4:16 PM | 1156 |
| 43219876 | 2222-3333-4444-5555 | 48965 | $235.18 | 3/14/97 | 10:15 AM | 9587 |
| 56781234 | 7777-3333-2222-1111 | 32340 | $36.75 | 3/6/97 | 1:26 PM | 0613 |
| 96385274 | 9999-8888-9999-9999 | 93407 | $401.60 | 2/28/97 | 12:07 AM | 6460 |

METHOD AND SYSTEM FOR PROCESSING CUSTOMIZED REWARD OFFERS

TECHNICAL FIELD

The present invention relates generally to methods and systems for promoting the use of financial accounts. More particularly, the present invention relates to a method and system which facilitates generating, communicating and managing a customized reward offer presented to an account holder.

BACKGROUND ART

Methods and systems for promoting usage of credit card accounts are well known. Such methods and systems are generally designed to reward a credit card holder for exhibiting behavior preferred by a credit card issuer. Credit card reward programs typically fall into one of three categories: reward accrual programs, tiered reward programs and specialty programs.

Reward accrual programs promote usage of a credit card account by rewarding a card holder for account usage with either rebates or redeemable program points. In such programs, account usage is typically measured as a function of either total charge volume or total revolving credit. Generally, card holder performance is measured monthly, and rewards are distributed based on the monthly measurements.

A frequent flyer mile reward program is one example of a reward accrual program. Another example of a reward accrual program is the annual cash rebate reward offered by the issuer of the Discover card. The issuer of the Discover card offers an annual cash rebate based upon a card holder's annual charge volume. The issuer analyzes card holders' annual charges and rewards card holders up to 1 percent cash back for qualifying transactions completed using the Discover card.

Another example of a reward accrual program is the General Motors ("GM") MasterCard automobile rebate program offered through Household Bank. Household Bank awards GM MasterCard card holders rebate dollars which can be redeemed upon a purchase of a GM brand automobile. Like the Discover card program, GM MasterCard card holders accrue dollars based on transactions completed using the GM MasterCard card.

Through programs such as the Discover and Citibank reward accrual programs, card holders are rewarded for account usage based on predetermined objective criteria. These programs have several significant shortcomings. A first shortcoming is the absence of a definite periodic performance target. Because a card holder is rewarded for virtually any account usage, the card holder is not necessarily encouraged to increase his account usage. A card holder continues to earn rewards even if his charge volume during a particular period drops significantly compared to a previous period.

Another shortcoming of accrual reward programs is that they fail to recognize the concept that every card holder will likely be most incented by a different reward. In the above described programs, the same type of rewards and the same level of rewards apply to an entire group of card holders. This one-size-fits-many approach fails to motivate those card holders who are more interested in other types of reward offers.

Yet another shortcoming of accrual reward programs is that they encourage the same type of activity for every card holder without regard to the individual profile of the card holder. By failing to analyze the profile of each card holder, the issuer could be increasing the risk of default on marginal quality accounts by incenting increased card usage. For example, in a program which encourages revolving charges, card holders with below average credit credentials may be encouraged to over-extend themselves. In such a circumstance, a card holder is actually encouraged to behave in a manner that is detrimental to the credit card issuer.

Tiered reward programs promote usage of a credit card account by rewarding a card holder for account usage at certain predefined levels. Like other reward programs, account usage is usually measured as a function of either total charge volume or total revolving credit, but tiered reward programs distribute rewards only to those card holders performing above certain performance levels. In many tiered reward programs, several performance levels are established by the issuer with each performance level having an associated reward.

The "Chase Retail Rewards Program" is an example of a tiered reward program. In this program, a card holder can earn a lower interest rate by carrying a higher balance. Chase has defined several tiers of rewards based on an average account balance. Each successive tier has a lower interest rate associated with it. For example, a card holder maintaining a balance above $1,000 is charged 5 percent above the prime interest rate, while a card holder maintaining a balance above $2,000 is charged 4 percent above the prime interest rate.

A system and method for administering a tiered reward program is disclosed in U.S. Pat. No. 5,025,372 by Burton et al. The '372 patent describes a system for processing and distributing rewards based on a participant's achieving a predefined level of performance. The predefined performance levels are selected by a sponsoring company, and the rewards are limited to credits to the card holder's account. The invention disclosed by the '372 patent is constrained by the same shortcomings as other conventional tiered reward programs.

Although tiered reward programs encourage a card holder to perform at a higher level, there are significant shortcomings associated with these types of methods. A first shortcoming is that the rewards are predefined for the entire population of participating card holders. A card holder who is not interested in the offered rewards will not be motivated to perform at a higher level. These programs are not customized to the preferences of the individual card holders.

Another shortcoming of tiered reward programs is that, like the reward accrual programs previously discussed, they encourage the same type of activity for every card holder without regard to the individual profile of the card holder. There is presently no tiered reward program which can set individualized performance targets for each card holder based on the card holder's transaction history and preferences.

Recently, some credit card issuers have implemented specialty programs which are tailored to a particular group of card holders. GE Capital, for example, has introduced the "GE Capital Gains Card" which is a travel and entertainment card that rewards card holders for saving rather than spending money. GE offers a card holder bonus points redeemable for airline tickets or gifts if the card holder conforms to behaviors identified by the card holder's company. For example, if a card holder conforms to a corporate travel policy by flying with a preferred carrier or staying at a preferred hotel, the card holder will be awarded points. Such specialty cards have similar shortcomings to the accrual and tiered reward programs described above.

Accordingly, the shortcomings associated with the related art have heretofore not been adequately addressed. The present invention addresses such problems by providing a system and processing approach that have not previously been proposed.

SUMMARY OF THE INVENTION

The present invention provides a method and system to define, manage and evaluate reward offers which are customized based on specific account criteria. Accordingly, account holders may be induced to exhibit behavior desired by an account issuer.

A method is disclosed for providing and managing a customized reward offer to a holder of a financial account. The method includes the step of accessing historical account data associated with the financial account. The method further includes the step of determining a first performance target associated with the financial account. The method also includes the steps of selecting a reward offer having an associated reward description and transmitting the first performance target and the reward description to the account holder.

The method continues with the steps of collecting transaction data associated with the financial account and evaluating the collected transaction data to determine a second performance target associated with the financial account. The collected transaction data is then compared to said first performance target. If the collected transaction data exceeds the first performance target, the financial account is updated to reflect the reward. A system is also provided to implement the steps of the above described method.

It is an object of the present invention to provide a method and system for promoting the use of a financial account which enables a credit card issuer to tailor targets and rewards based on individual card holder account characteristics. The above object and other objects features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein.

DETAILED DESCRIPTION

System Architecture

Figure 1:
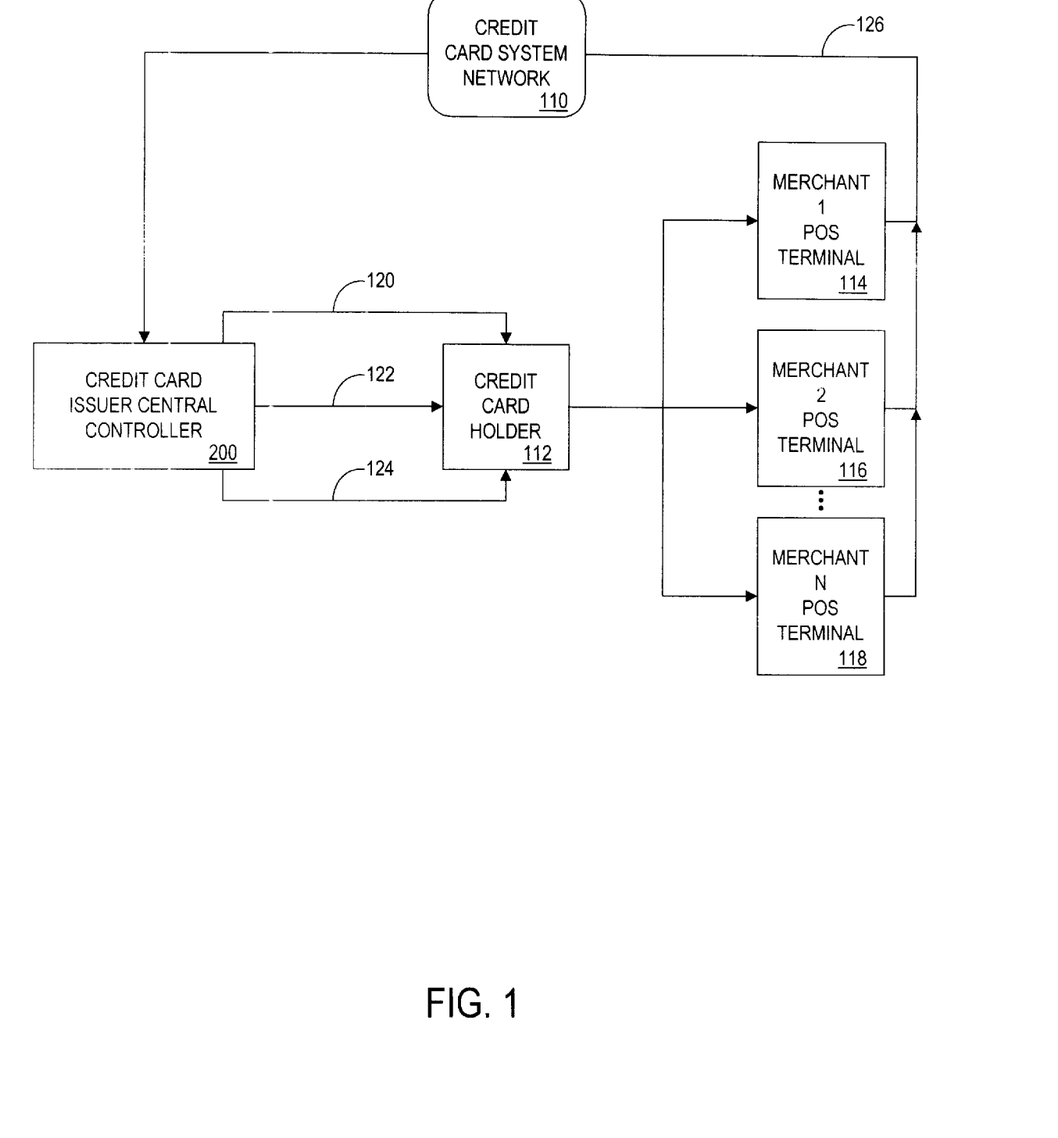
FIG. 1 is a schematic block diagram illustrating the information flow between parties according to the present invention.

An embodiment of the method and system of the present invention will now be discussed with reference to FIGS. 1–8. FIG. 1 illustrates, in schematic block diagram format, the information flow between relevant parties according to one embodiment of the present invention. As shown, a credit card issuer central controller ("CCI") 200 transmits information to a credit card holder 112. Although such information may be transmitted electronically, it is typically transmitted via a periodic account statement (not shown).

According to the present invention, CCI 200 accesses stored historical account data associated with the account of credit card holder 112 and determines a first performance target for credit card holder 112. CCI 200 then selects a reward to offer credit card holder 112 if he behaves in accordance with the first performance target. As shown in FIG. 1, this first customized reward offer, including the first performance target, the reward and a first target period, is transmitted to credit card holder 112 as indicated by reference numeral 120.

After receiving the transmission of the customized reward offer from CCI 200, credit card holder 112 may initiate and complete transactions affecting the credit card account in an effort to achieve the communicated first performance target. As shown, transactions may be conducted with various merchants using point-of-sale ("POS") terminals 114, 116 and 118. As indicated by reference numeral 126, CCI 200 collects transaction data from POS terminals 114, 116 and 118 through a conventional credit card system network ("POS network") 110. This transaction data is stored by CCI 200 and is used to manage the account of credit card holder 112.

In the preferred embodiment, CCI 200 evaluates the collected transaction data to determine a second performance target for credit card holder 112 prior to the end of the first target period. In alternate embodiments, the determination of the second performance target could be completed at or subsequent to the end of the first target period. The determination of the second performance target is based on the first performance target and the transaction information collected since the transmission of the first customized reward offer. The determination of the second performance target may also be based on the historical transaction data associated with the account of credit card holder 112 or other credit card holder profile data. After determining the second performance target, CCI 200 transmits to credit card holder 112 a second customized reward offer identified by reference numeral 122. This second transmission includes the second performance target, the reward and a second target period.

Upon expiration of the first reward offer, CCI 200 compares the first performance target to the transaction data collected since the transmission of the first reward offer. If credit card holder 112 has achieved the performance target, CCI 200 updates the credit card holder account to reflect the reward. In the preferred embodiment, CCI 200 transmits to credit card holder 112 an announcement of the reward earned by credit card holder 112 for achieving the first performance target.

Figure 2:
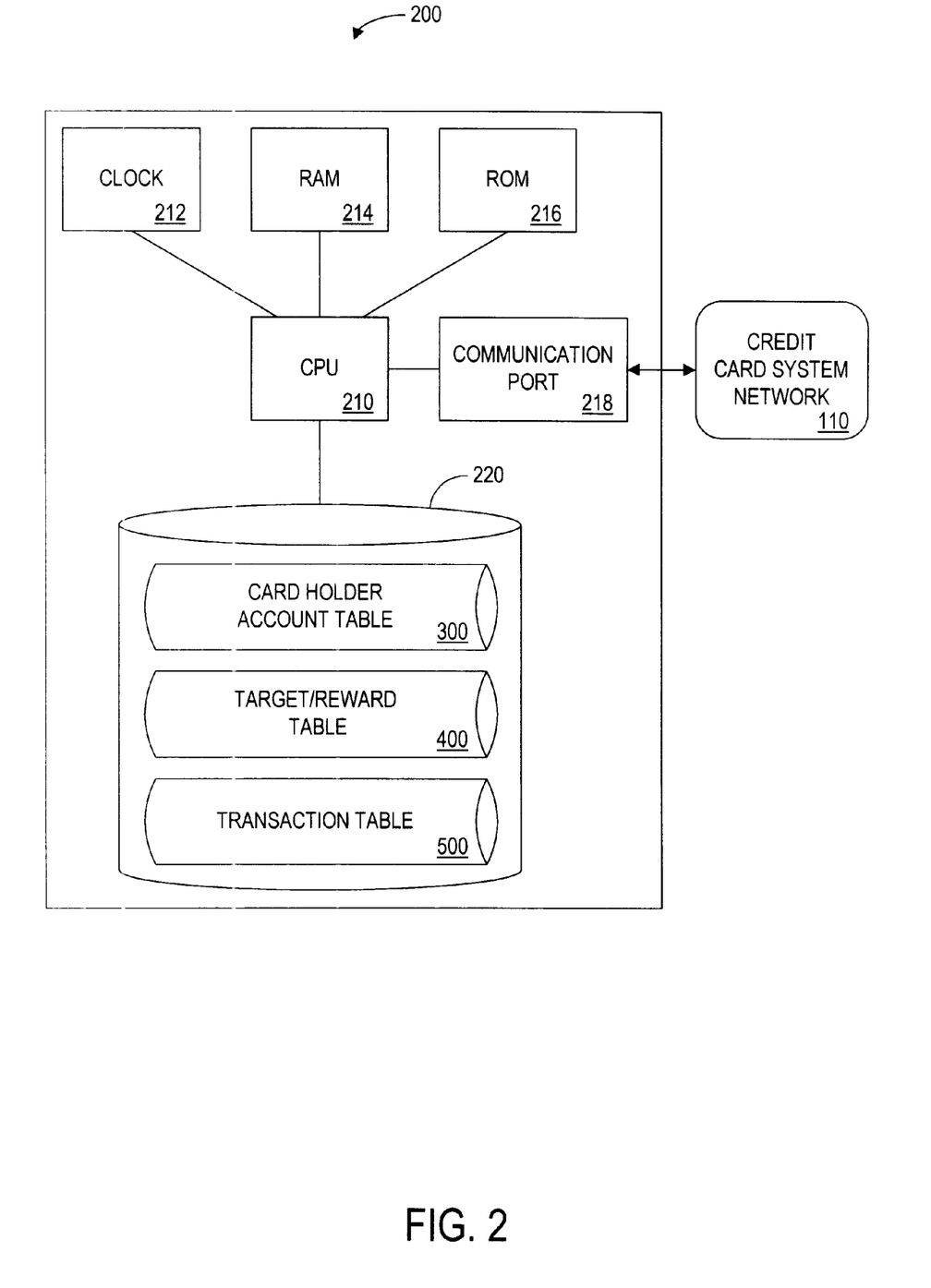
FIG. 2 is a schematic block diagram illustrating the components of a credit card issuer central controller according to one embodiment of the present invention.

Referring now to FIG. 2, CCI 200 is illustrated in greater detail. As shown, CCI 200 includes a central processing unit ("CPU") 210, a clock 212, a random access memory ("RAM") 214, a read only memory ("ROM") 216, a communication port 218, and a storage device 220. Communication port 218 provides a connection between CCI 200 and POS network 110 allowing communication between CCI 200 and POS network 110.

As shown in FIG. 2, storage device 220 stores a database of account, target and reward data, including a card holder account table 300; a target/reward table 400; and a transaction table 500. Tables 300, 400 and 500 comprise at least a portion of the database stored by storage device 220 and are described more fully with reference to FIGS. 3, 4 and 5 respectively. Storage device 220 is preferably a magnetic disk drive, but could be a CD-ROM drive, optical disk drive, RAM drive or any other conventional storage device.

Figure 3:
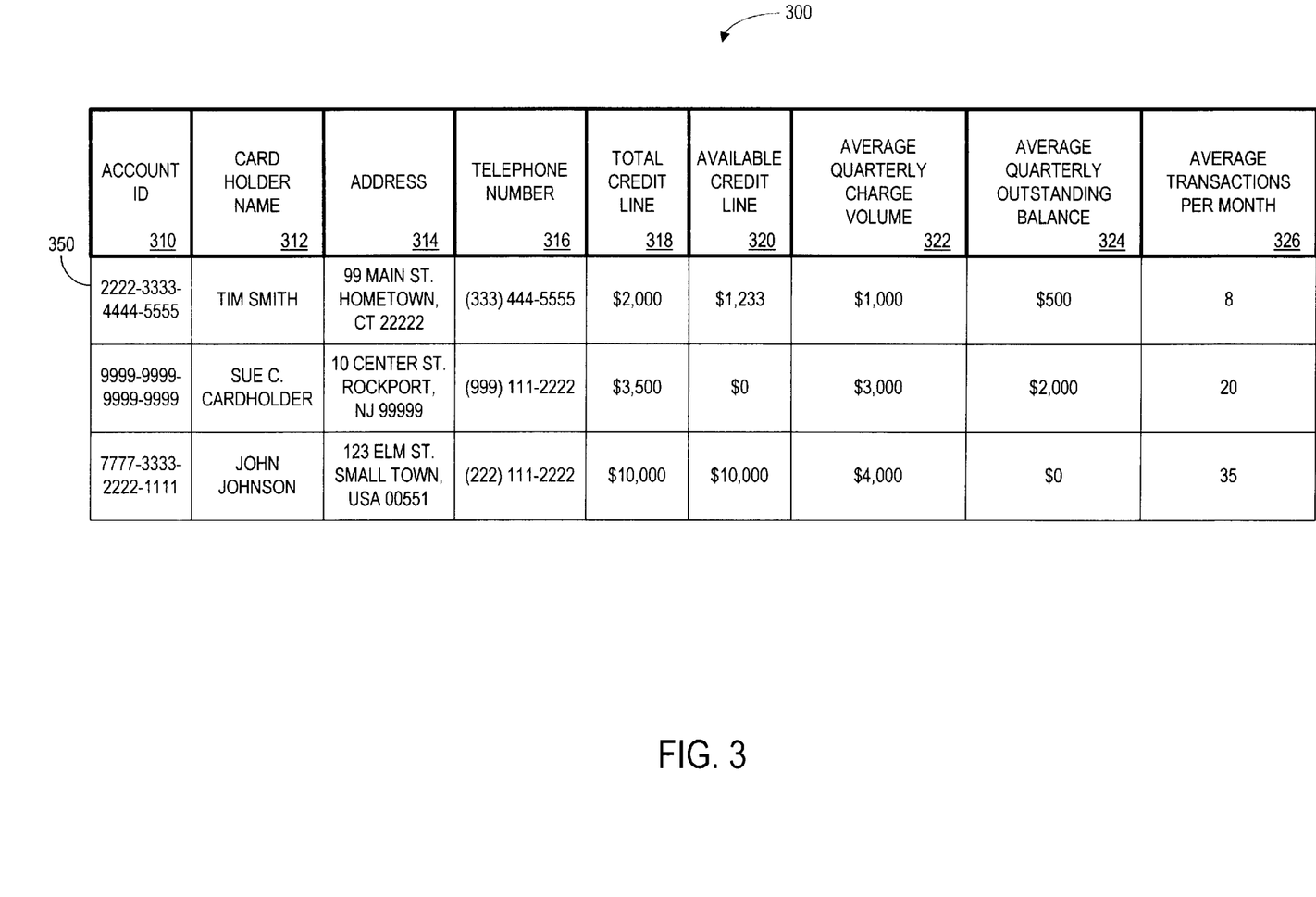
FIG. 3 is a table illustrating the structure of a card holder account table stored at the credit card issuer central controller.

FIG. 3 illustrates the contents of card holder account table 300 in tabular format. Each record of account table 300 represents information pertaining to a card holder account. This information may be considered an account header in the art and includes the following six information elements: account ID field 310; card holder name element 312; address element 314; telephone number field 316; credit line field 318; and available credit field 320.

Account ID field 310 stores a unique account identifier. Account ID field 310 is assigned by the credit card issuer to uniquely identify an account of a card holder. In the present embodiment, the unique account identifier will be a standard 16 digit credit card account number.

Card holder name element 312 stores the name of a card holder 112 who is responsible for the account described by the account table record. Card holder name element may be a single field, but will more likely be a combination of fields.

Address element 314 stores the mailing address of the card holder. Although the preferred embodiment shows only one address element, it may be useful to provide multiple address elements to accommodate a home address, a billing address and a business address. Address element 314 may be a single field, but will more likely be a combination of fields.

Telephone number field 316 stores the home telephone number of the card holder 112 responsible for the account. Additional telephone numbers, such as office and facsimile numbers, may also be stored in account table 300.

Total credit line field 318 stores the maximum amount of credit that the credit card issuer has provided to the card holder responsible for the account. Available credit line field 320 stores the amount of unused credit available to the credit card holder responsible for the account. Although available credit line field 320 is stored in account table 300 in the preferred embodiment, this information could easily be calculated as necessary by subtracting the outstanding balance from the contents of total credit line field 318.

Figure 5:
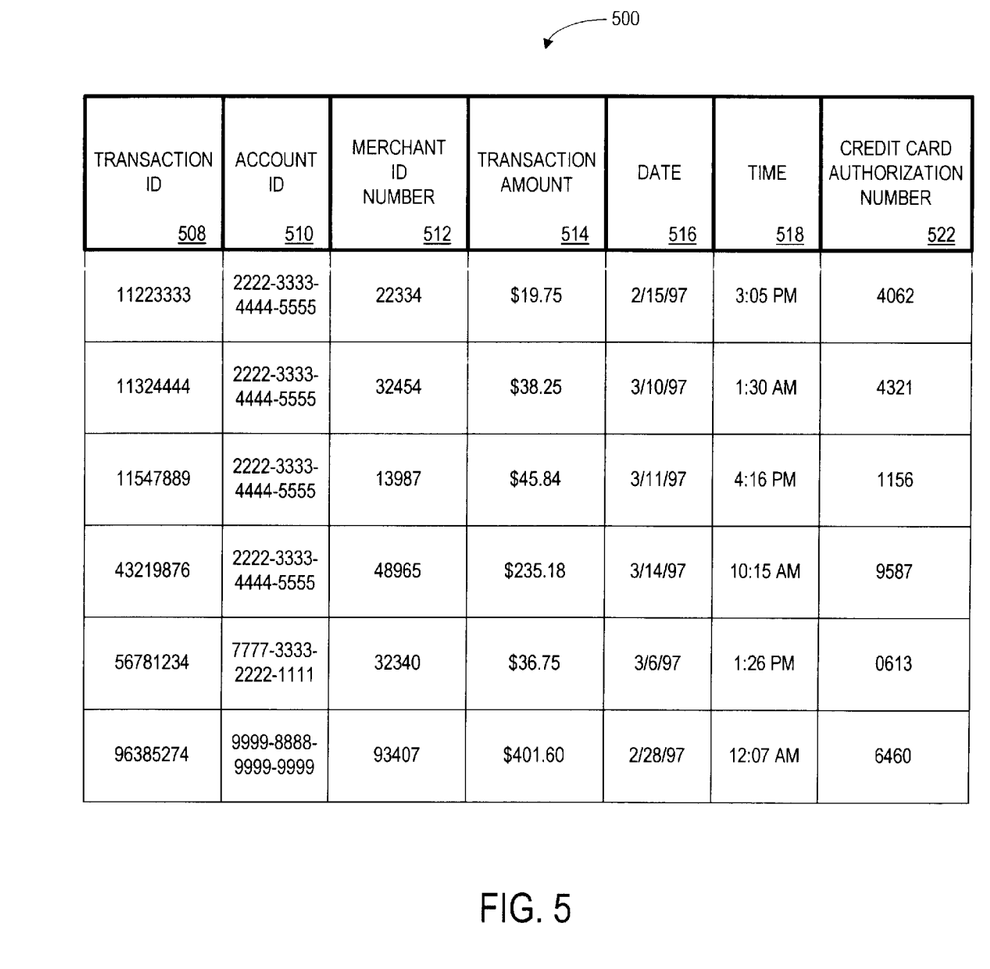
FIG. 5 is a table illustrating the structure of a target/reward table stored at the credit card issuer central controller.

The present embodiment of the invention further includes average quarterly charge volume field 322, average quarterly outstanding balance field 324 and average transactions per month field 326, all containing data which describe various characteristics of an account. These fields are populated by CCI 200 based on data maintained in transaction table 500, and may be used as a predictors of future account activity. The contents of these fields are self explanatory and may be derived in a variety of well known ways.

Figure 4:
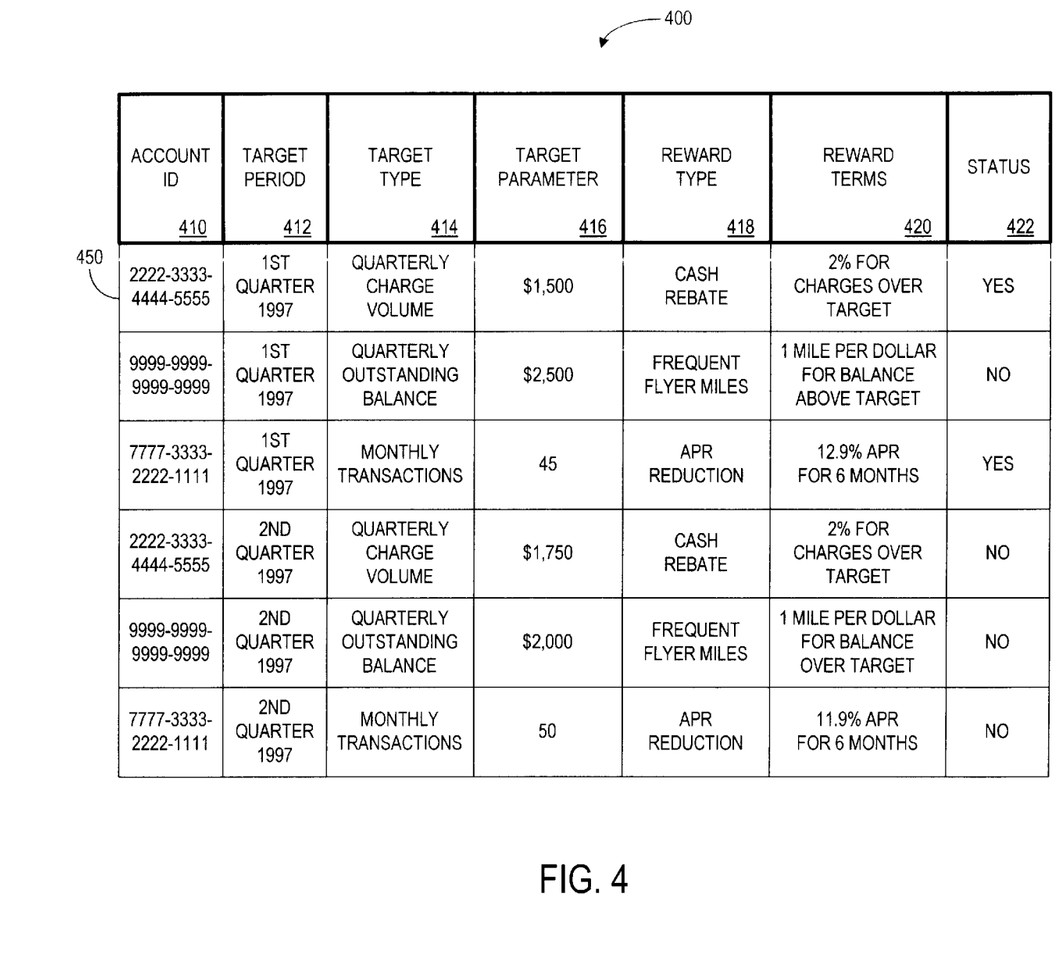
FIG. 4 is a table illustrating the structure of a performance target table stored at the credit card issuer central controller.

FIG. 4 illustrates the contents of target/reward table 400. Each record of target/reward table 400 represents information pertaining to a performance target and corresponding reward offered to a particular card holder account. This table allows a credit card issuer to set, track, evaluate and reward the desired performance of a card holder and includes the following seven information elements: account ID field 410; period element 412; target type field 414; target parameter field 416; reward type field 418; reward terms element 420; and status field 422. The fields of target/reward table 400 are populated with values determined by the credit card issuer. The steps for determining these values are described in more detail with reference to FIG. 6.

Account ID field 410 stores a unique account identifier that uniquely identifies an account of a card holder. Target period element 412 identifies the period of time which a credit card holder is provided to achieve a defined target. In the example shown in FIG. 4, target period element 412 is based on calendar quarters. In alternative embodiments, however, the target periods could be months, years or based on specific start and end dates.

Target type field 414 stores a code representing a type of target assigned to an account identified by account ID field 410. Although field 414 typically only contains a code, the contents of field 414 illustrated in FIG. 4 show the logical representations of the target type. The type of performance target applicable to a card holder account is generally selected from a set of target types defined by the credit card issuer. In the example shown in FIG. 4, target type field 414 may store a code representing a target quarterly charge volume, a target quarterly outstanding balance, and a target number of transactions per month. Of course, credit card issuers may define numerous alternative target types including, but not limited to, target monthly principle payments, target annual purchases at specific merchants and target balance transfer amounts.

Target parameter field 416 stores the performance level at which a card holder must perform during the period identified by target period element 412 to achieve a reward. The data stored in target parameter field 416 is used to determine whether a card holder has achieved the target set by the credit card issuer. Use of target parameter field 416 is dependent on the contents of target type field 414.

Reward type field 418 stores a code representing a type of reward offered to a card holder responsible for the account identified by account ID field 410 for the target period 412. Like target type field 414, reward type field 418 typically only contains a code. The logical representations of the code of field 418 are illustrated in FIG. 4. As shown, the example reward types illustrated in FIG. 4 include a cash rebate reward, a frequent flyer mile reward and an APR reduction reward. Numerous alternative reward types are possible, including without limitation magazine subscriptions, free gifts and discount coupons.

Reward terms element 420 stores a code representing the terms of the reward associated with the record. CCI 200 uses the data of reward terms field 420 to provide rewards to a credit card account in the event the performance target has been achieved. The meaning of reward terms field is interpreted based, in part, on the value of reward type field 418. in the present embodiment of the invention, reward status field 422 is included to store a code indicating whether the performance target for the account has been satisfied.

Referring now to FIG. 5, there is illustrated the contents of transaction table 500. Each record of transaction table 500 represents a transaction between a credit card holder and a merchant. Transaction table 500 includes the following seven fields: transaction ID field 508; account ID field 510; merchant ID field 512; transaction amount field 514; date field 516; time field 518; transaction authorization number field 520; and credit card authorization number 522. Transaction table 500 may be used to analyze the account activity of each account stored in card holder account table 300. Analysis of account activity may be performed in any number ways well known by one of ordinary skill in the credit card processing field.

System Operation

Having thus described the system architecture and components of the present embodiment, the operation of the system will now be described in greater detail with reference to FIGS. 6–8, and continuing reference to FIGS. 1–5. It is to be understood that the software instructions (not shown) necessary to provide the functionality described herein are preferably stored in ROM 216 or storage device 220 of CCI 200.

Figure 6:
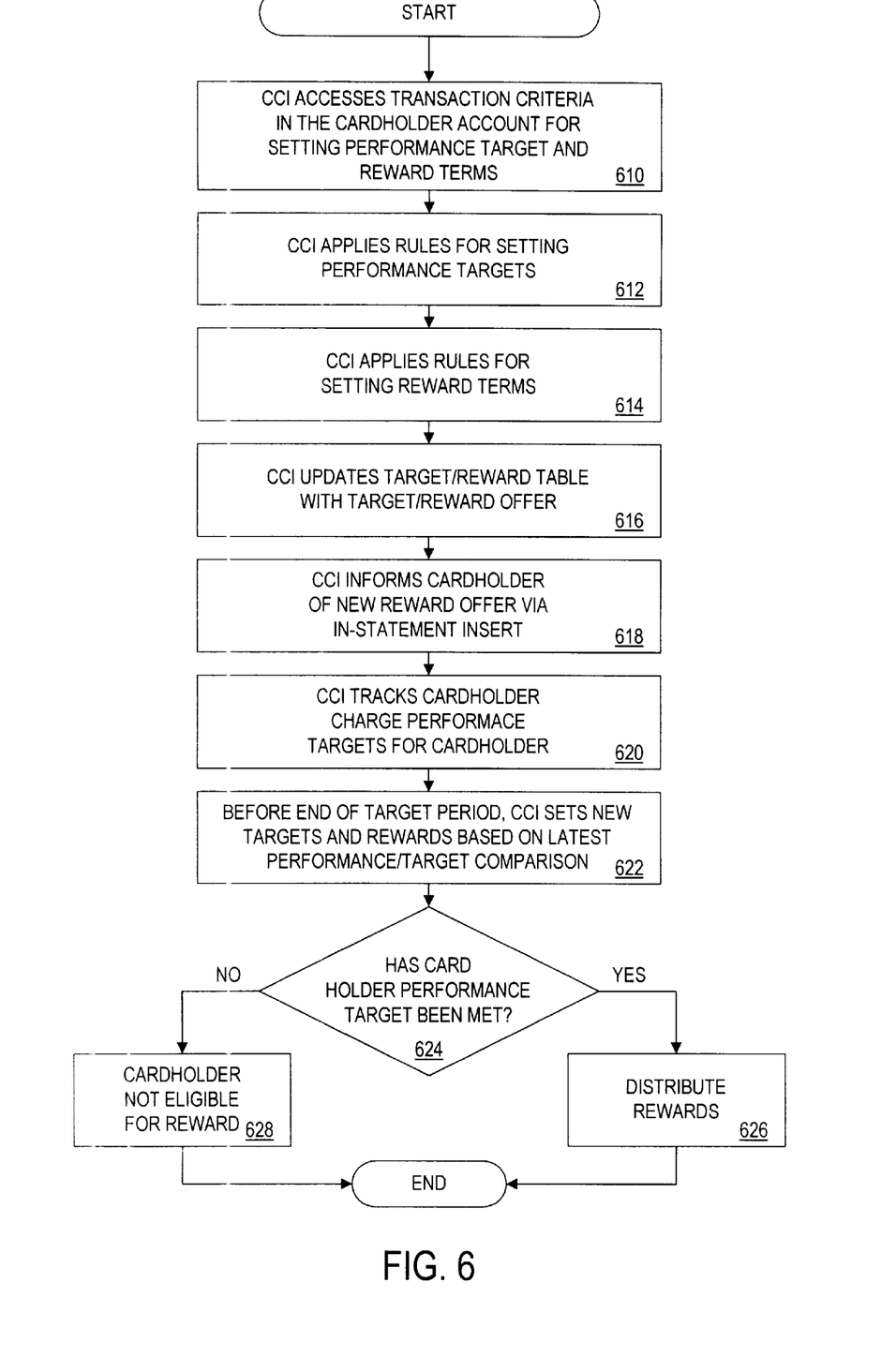
FIG. 6 is a flow chart illustrating the computer implemented steps used to set customized rewards according to one embodiment of the present invention.

Referring now to FIG. 6, the general operation of the present invention will be described. As shown at step 610, CCI 200 accesses data stored in card holder account table 300 for setting performance targets. The criteria referred to at step 610 includes fields 322, 324 and 326. As previously indicated, these fields are populated by CCI 200 based on an analysis of records in transaction table 500. Although specific criteria are identified in the present embodiment, the criteria may be any information that an issuer believes to be indicative of particular card holder behavior. The criteria forms the basis for determining performance targets, reward terms or both.

One method presently employed by credit card issuers to predict and influence card holder behavior is determining a score defined by a scoring system. Scoring systems are mathematical models designed to provide probabilities of future performance based on a creditor's actual historic performance. Models are developed from past behavior and data relationships and are used to identify predictive variables. Scoring systems can be used as absolute decision tools or in combination with judgmental and expert system rules.

Credit card issuers are currently using scores to determine: who will respond to an offer; who will reliably repay credit; and who will generate revenue for a lender. These scores are known as response scores, risk scores and revenue scores, respectively. Response Scores are used to determine how to modify solicitations for maximum results and for areas of the country that have the greatest growth potential for specifically designed card products like insurance or investment cross-sells. Risk Scores are used to predict delinquencies and bankruptcies. They are also used to predict the extent and timing of monthly payments. Revenue scores assign a ranking to individuals by the relative amount of revenue they are likely to produce over a period of time following score assignment. Revenue scores help issuers in account management by identifying inactive accounts that ought to be targeted with an appropriate offer and by identifying the most desirable prospects for acquisition.

A score may also be classified as either a credit score or a behavior score. A credit score is a statistical measure used by creditors to determine whether to extend credit in the form of a loan or as a credit line on a credit card. Credit scores takes into account many factors, including: annual income, years at current job, residence, debt payment history, current debt obligations and long term debt obligations. Creditors may assign different weights to these criteria to compute a credit score.

A behavior score is another statistical measure used by issuers to better manage individual accounts to maximize profit per account. The behavior score can include more than 50 different characteristics, including: extent of monthly payments, promptness of payment, use of card for purchases or cash advances, size and type of purchases and types of spending categories among others.

One way to select relevant criteria for setting performance targets is illustrated at step 610, wherein CCI 200 accesses account data derived from historic transaction data such as average quarterly charge volume 322, average quarterly outstanding balance 324 and average number of monthly transactions 326. CCI 200 then accesses rules for setting performance targets at step 612. These rules may be stored in a database or otherwise implemented through software. These rules are applied against the criteria determined at step 610. Illustrative examples of rules for setting performance targets are described with reference to Table I, below.

TABLE I

Rules for setting performance targets

| Rule | Target Type | Target Parameter |
| --- | --- | --- |
| If quarterly charge volume (x) is less than a predetermined minimum volume | Quarterly charge volume | Target charge volume = mx |
| If quarterly outstanding balance (y) is less than a predetermined percentage of total credit line | Quarterly outstanding balance | Target quarterly outstanding balance = ny |
| If transactions per month (z) is less than a predetermined minimum number | Transactions per month | Target transactions per month = pz |

To apply the first rule of Table I, CCI 200 must determine a quarterly charge volume for a subject account as one of the criteria determined at step 610. At step 612, t he determined quarterly charge volume is compared to a predetermined minimum volume. If the determined volume is less than the minimum, a target quarterly charge volume will be set for the account. The target quarterly charge volume will be equal to the determined quarterly charge volume of the account times a multiplier m. Application of the remaining two rules is accomplished in a similar fashion, where m, n and p are numbers greater than zero.

The quarterly charge volume, quarterly outstanding balance and number of transactions per month are readily calculated by one having ordinary skill in the art. Of course, the rules of Table I are merely simple illustrative examples of the numerous rules which could be implemented by a credit card holder, depending on its particular needs, and that multipliers m, n and p may vary for each account.

It should be recognized that multiple targets and rewards could be determined for some or all card holder accounts. It should also be recognized that credit card issuers are not limited to the criteria defined herein. The criteria on which targets are determined may be based on a credit card issuer's interpretation of behavior and revenue scores for the account, on a combination of scores and specific behavior indicators, such as those shown in card holder account table 300, or on any other predictive variable.

At step 614, CCI 200 accesses rules for setting reward terms. Like the rules for setting performance targets, these rules may be stored in a database or otherwise implemented through software and are applied against the criteria determined at step 610. Illustrative examples of rules for setting reward terms are described with reference to Table II, below.

TABLE II

Rules for setting reward terms

| Rule | Reward Type | Reward Offer |
|---|---|---|
| If current cash rebate is j percent | Cash rebate | Reward offer = qj |
| If frequent flyer mile level equals 1 mile per dollar charged | Frequent flyer miles | Reward offer = 1.5 miles per dollar charged |
| If current APR equals 19% | Reduced APR | Reward offer = 18% APR |

To apply the first rule of Table II, CCI 200 must determine the current cash rebate percentage corresponding to a subject account as one of the criteria determined during step 610. The determined cash rebate percentage may be a global parameter that applies to all accounts; it may be a parameter that is customized for each account; or it may be otherwise calculated. At step 612, the determined cash rebate percentage is multiplied by a variable q to set the reward terms where j and q are numbers greater than zero. Application of the remaining two rules is accomplished in a similar fashion.

While the rules of Table II are provided as simple illustrative examples of rules for setting reward terms, numerous other rules could be implemented by a credit card issuer, depending on its particular needs. For example, the credit card issuer could use card holder input to select and set reward terms. One way of collecting card holder input is by providing a card holder a menu of reward options from which to select preferences. In addition, it should be recognized that a mechanism for selecting between rules could be easily implemented by a credit card issuer, and could be based on issuer preferences, mutual exclusivity of rules or any other selection mechanism.

At step 616, CCI 200 updates target/reward table 400 to reflect the target and reward terms. Specifically, CCI 200 adds a new record to target/reward table 400 and populates field 410 with the subject account ID; element 412 with data indicating the period of the target and reward offer; fields 414 and 416 with the target type and target parameter determined at step 612; and fields 418 and 420 with the reward type and reward terms determined at step 614.

As shown, at step 618, CCI 200 outputs a periodic account statement to inform card holder 112 of the reward offer. The periodic account statement includes the performance target, the target period and the reward terms to induce card holder 112 to behave in a manner prescribed by the credit card issuer and achieve the communicated performance target during the target period. Although the periodic statement of the present embodiment is a written communication between the issuer and the card holder, the communication could take any number of forms including updating a database accessible by the card holder or transmitting an electronic or facsimile representation of a periodic statement.

As previously described with reference to FIG. 1, throughout the target period CCI 200 stores transaction data relating to the account of card holder 112. The transaction data is received from various merchants. At step 620, CCI 200 stores the received data in transaction table 500, and updates status field 422 based on a comparison of the aggregate transaction data to the performance target data stored in performance target table 400. Prior to the end of the target period, CCI 200 determines a second set of target and reward data based on the received transaction data in transaction table 500, the current period performance target and reward offer data in target/reward table 400. An example of the specific steps executed at step 622 are more fully described with reference to FIG. 8.

Finally, at the end of the current target period, CCI 200 determines whether a card holder has achieved the performance targets determined at step 612. A example of the specific steps executed at step 624 are more fully described with reference to FIG. 7. If the card holder has failed to achieve the performance targets determined at step 612, no rewards are awarded, as shown by step 628. If, however, the performance targets determined at step 612 have been achieved, CCI 200 updates the appropriate account data to reward card holder 112 for exhibiting the desired behavior, as shown by step 626.

Figure 7:
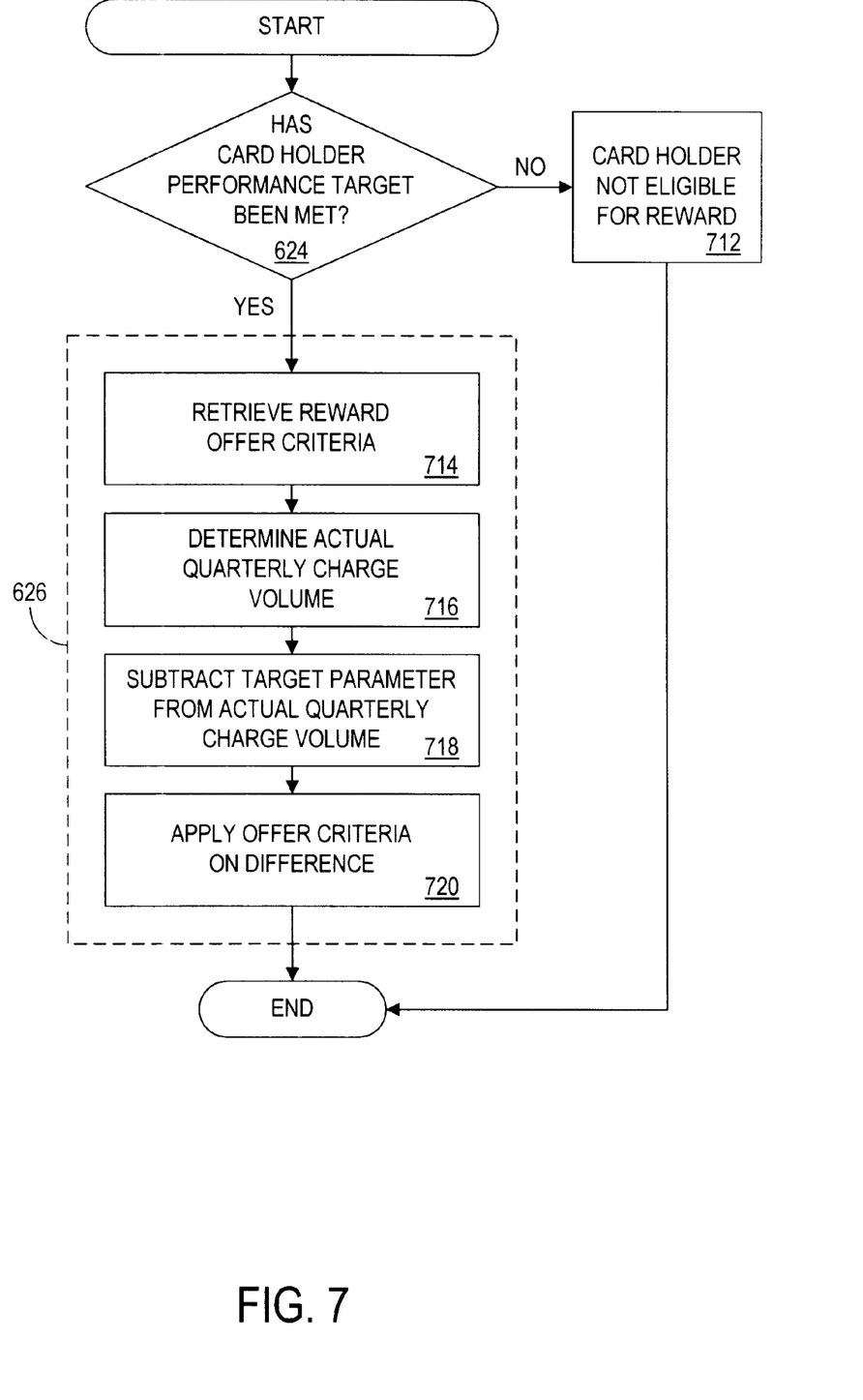
FIG. 7 is a flow chart illustrating the computer implemented steps used to determine earned rewards according to one embodiment of the present invention.

Referring now to FIG. 7, there is illustrated a specific example of the processing steps executed during steps 624 and 626 of FIG. 6. The specific example relates to the card holder account associated with record 350 of card holder account table 300 and record 450 of target/reward table 400. As shown by record 450, the card holder responsible for account having account ID 2222-3333-4444-5555 was offered a cash reward of two percent of charges transacted during the first quarter of 1997 which exceed $1,500.00. At step 624, CCI 200 determines whether the quarterly charge volume for account 02222-3333-4444-5555 is equal to or greater than $1,500.00. This is preferably accomplished by examining status field 422 of record 450. As shown, the performance target defined by record 450 has been met.

If the card holder performance had failed to meet the performance target, the card holder would not be eligible for a reward, as shown at step 712. Since the card holder performance exceeds the performance target, CCI 200 executes the steps generally referred to by reference numeral 626 in FIG. 6. At step 714, CCI 200 accesses and retrieves the reward offer criteria from fields 418 and 420 of record 450. Based on fields 414 and 416 of record 450, CCI 200 determines the actual quarterly charge volume of the account at step 716. This may be performed in any number of well known ways including, without limitation, accessing a defined field in an account header or calculating the amount using account record 350 and related records of transaction table 500.

At step 718, CCI determines the amount of quarterly charge volume exceeding the performance target by subtracting the actual quarterly charge volume determined at step 716 from $1,500.00, target parameter 416 of record 450. Finally, at step 720, CCI 200 applies the reward terms of two percent to the difference determined at step 718, and CCI 200 updates transaction table 400 to distribute the cash rebate.

Figure 8:
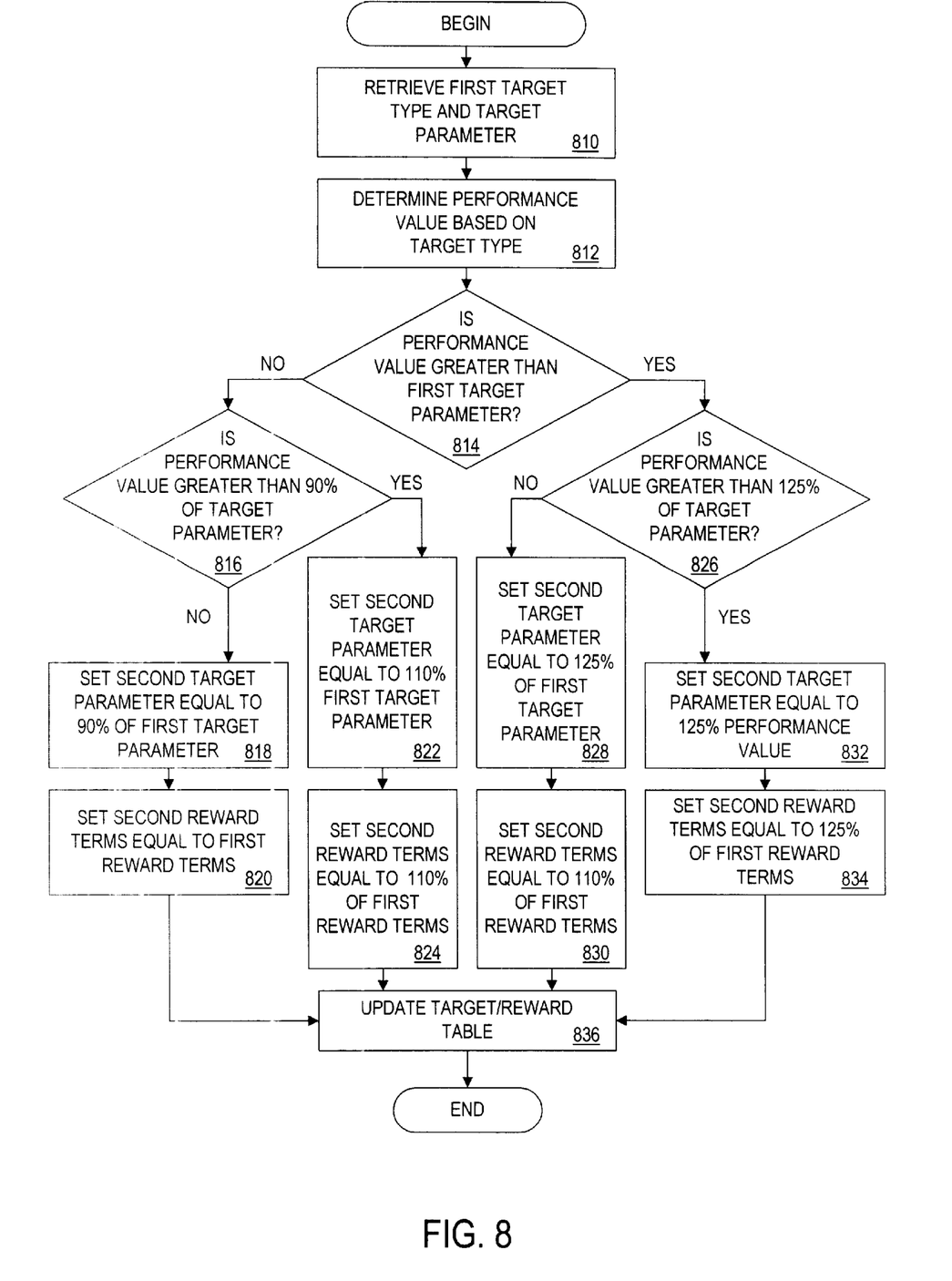
FIG. 8 is a flow chart illustrating the computer implemented steps used to periodically adjust performance targets according to one embodiment of the present invention.

Referring now to FIG. 8, there is a flow chart illustrating specific steps which may be executed to determine a second set of target and reward data. The steps depicted in FIG. 8 are merely illustrative of one specific implementation and are not intended to limit the scope of the present invention. Other embodiments which are within the scope of the present invention will be readily apparent to one of ordinary skill.

At step 810, CCI 200 retrieves first target type 414 and first target parameter 416 from target/reward table 400. Based on first target type 414, as shown at step 812, CCI 200 determines a card holder performance value representing the card holder's performance during the target period. The card holder performance value may be calculated based on historical transaction data in transaction table 500 or may be retrieved from card holder account table 300, such as from fields 322, 324 and 326. At step 814, CCI 200 compares the card holder performance value to first target parameter 416.

If the card holder performance value is less than or equal to the first target parameter 416, the card holder has not yet achieved the first performance target. In that case, CCI 200 processes step 816 and determines whether the card holder performance value is within 90% of the first target parameter 416. If the card holder performance value is less than or equal to 90% of the first target parameter 416, CCI 200 determines the second target parameter by multiplying the first target parameter by 0.9, and sets the second reward terms equal to the first reward terms, as shown at steps 818 and 820. This is intended to reduce the target to enable the cardholder to achieve it.

If the card holder performance value is greater than 90% of the first performance target, CCI 200 sets the second target parameter equal to 110% of the first target parameter and sets the second reward terms equal to 110% of the first reward terms, as shown at steps 822 and 824. This is intended to encourage the card holder to marginally exceed the original target and earn proportionally greater rewards.

Referring back to step 814, if the card holder performance value is greater than or equal to the first performance target, the card holder has achieved the first performance target. At step 826, CCI 200 determines whether the card holder performance value is more than 125% of the first performance target. If the card holder performance value is less than or equal to 125% of the first performance target, the card holder has only marginally exceeded the first performance target. In which case, CCI 200 sets the second target parameter at 1.25 times the first target parameter and sets the second reward terms at 1.1 times the first reward terms, as shown by steps 828 and 830. The second target and reward values are set to incent the card holder to exceed his present performance in the second period.

If the card holder performance value exceeds 125% of the first performance target, the card holder performance is considered exceptional. Accordingly, the second target parameter is set equal to 125% of the card holder performance value and the second reward terms are set equal to 125% of the first reward terms. By determining the second performance target based on the card holder's actual performance value, the exceptionally performing card holder is incented to step up his performance even more during the second period. As shown at step 836, a record is added to target/reward table 500 containing the second performance target and the second reward terms.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

We claim:

1. A device for providing and managing a customized reward offer to a holder of a financial account, said device comprising:

a memory storing:
    historical account data associated with said financial account; and
    transaction data associated with said financial account; and a processor operatively connected to said memory, said processor programmed to:
    access said historical account data;
    determine a first performance target associated with said financial account;
    select a reward offer having an associated reward description;
    collect and evaluate said transaction data to determine a second performance target associated with said financial account;
    compare said transaction data to said first performance target; and
    update said financial account to reflect said reward offer based on the step of comparing; and an output device operatively connected to said processor, said output device adapted to transmit said first performance target and said reward description to said account holder.

2. The device of claim 1 wherein said processor is further programmed to derive an average outstanding balance based on said historical data.

3. The device of claim 1 wherein said processor is further programmed to derive an average charge volume based on said historical data.

4. The device of claim 1 wherein said processor is further programmed to derive an average number of transactions over a predetermined period based on said historical data.

5. The device of claim 1 wherein said processor is further programmed to derive an account holder behavior score based on said historical data.

6. The device of claim 1 wherein said processor is further programmed to derive an account holder profitability score based on said historical data.

7. The device of claim 1 wherein said processor is further programmed to derive an account holder credit score based on said historical data.

8. The device of claim 1 wherein said processor is further programmed to derive an account holder performance score based on said historical data.

9. The device of claim 1 wherein said processor is further programmed to periodically transmit said transaction data to said account holder.

10. The device of claim 1 wherein said processor is further programmed to compare said collected transaction data to said historical account data.

11. The device of claim 1 wherein said processor is further programmed to compare said collected data to said first performance target.

12. The device of claim 1 wherein said processor is further programmed to compare said collected data and said historical data to said first performance target.

13. The device of claim 1 wherein said processor is further programmed to receive preference data generated by said account holder, said preference data representing reward preferences.

14. The device of claim 13 wherein said processor is further programmed to transmit a menu of reward options to said account holder.

15. The device of claim 1 wherein said output device is further adapted to print a periodic account statement.

16. The device of claim 1 wherein said processor is further programmed to update a database electronically accessible by said account holder.

17. The device of claim 1 wherein said processor is further programmed to modify an interest rate.

18. The device of claim 1 wherein said processor is further programmed to modify reward program point data.

19. The device of claim 18 wherein said point data represents frequent flyer miles accumulated by said account holder.

20. The device of claim 1 wherein said processor is further programmed to modify a minimum periodic payment parameter.

21. The device of claim 1 wherein said processor is further programmed to process a rebate.

22. A system for providing and managing a customized reward offer to a holder of a financial account, said system comprising:

means for accessing historical account data associated with said financial account;

means for determining a first performance target associated with said financial account;

means for selecting a reward offer having an associated reward description;

means for transmitting said first performance target and said reward description to said account holder;

means for collecting transaction data associated with said financial account;

means for evaluating said collected transaction data to determine a second performance target;

means for comparing said collected transaction data to said first performance target; and     means for updating said financial account to reflect said reward based on the step of comparing.

23. The system of claim 22 wherein said means for accessing historical account data derives an average outstanding balance.

24. The system of claim 22 wherein said means for accessing historical account data derives an average charge volume.

25. The system of claim 22 wherein said means for accessing historical account data derives an average number of transactions over a predetermined period.

26. The system of claim 22 wherein the means for accessing historical account data derives an account holder behavior score.

27. The system of claim 22 wherein the means for accessing historical account data derives an account holder profitability score.

28. The system of claim 22 wherein the means for accessing historical account data derives an account holder credit score.

29. The system of claim 22 wherein the means for accessing historical account data derives an account holder performance score.

30. The system of claim 22 wherein the means for selecting includes receiving preference data generated by said account holder, said preference data representing reward preferences.

31. The system of claim 30 wherein the means for selecting includes transmitting a menu of reward options to said account holder.

32. The system of claim 22 wherein the means for transmitting includes printing a periodic account statement.

33. The system of claim 22 wherein the means for transmitting includes updating a database electronically accessible by said account holder.

34. The system of claim 22 wherein the means for collecting includes periodically transmitting said transaction data to said account holder.

35. The system of claim 22 wherein the means for evaluating includes comparing said collected transaction data to said historical account data.

36. The system of claim 22 wherein the means for evaluating includes comparing said collected data to said first performance target.

37. The system of claim 22 wherein the means for evaluating includes comparing said collected data and said historical data to said first performance target.

38. The system of claim 22 further comprising the means for comparing said collected transaction data to said first performance target.

39. The system of claim 22 further comprising the means for updating said financial account to reflect said reward based on the means for comparing.

40. The system of claim 22 wherein the means for updating includes modifying an interest rate.

41. The system of claim 22 wherein the means for updating includes modifying reward program point data.

42. The system of claim 41 wherein said point data represents frequent flyer miles accumulated by said account holder.

43. The system of claim 22 wherein the means for updating includes modifying a minimum periodic payment parameter.

44. The system of claim 22 wherein the means for updating includes processing a rebate.

45. A device for providing and managing a customized reward offer associated with a credit card account, said device comprising:

a memory storing:

historical account data associated with said credit card account; and         transaction data associated with said credit card account; and     a processor operatively connected to said memory, said processor programmed to:

access historical account data;

determine a first performance target associated with said credit card account;

collect transaction data associated with said credit card account; and         evaluate said collected transaction data to determine a second performance target associated with said credit card account; and     an output device operatively connected to said processor, said output device adapted to transmit said first performance target and said reward description to said account holder.

46. A computer-readable storage medium encoded with processing instructions for implementing a method for providing a customized reward offer with a credit card account, said processing instructions for directing a computer to perform the steps of:

accessing historical account data associated with said credit card account;

determining a first performance target associated with said credit card account;

collecting transaction data associated with said credit card account; and     evaluating said collected transaction data to determine a second performance target associated with said credit card account.

* * * * *